US009809097B1

(12) United States Patent
Metcalf et al.

(10) Patent No.: US 9,809,097 B1
(45) Date of Patent: Nov. 7, 2017

(54) PILLAR SEAL RETAINERS FOR MOTOR VEHICLE SEAL STRUCTURES

(71) Applicant: GM GLOBAL TECHNOLOGY OPERATIONS LLC, Detroit, MI (US)

(72) Inventors: Steven A. Metcalf, Royal Oak, MI (US); Larry A. Filipczak, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/212,757

(22) Filed: Jul. 18, 2016

(51) Int. Cl.
*B60J 10/27* (2016.01)
*B60J 10/36* (2016.01)
*B60J 10/777* (2016.01)
*B60R 13/06* (2006.01)

(52) U.S. Cl.
CPC .......... *B60J 10/7775* (2016.02); *B60J 10/27* (2016.02); *B60J 10/36* (2016.02); *B60R 13/06* (2013.01)

(58) Field of Classification Search
CPC ... B60J 10/27; B60J 10/36; B60J 10/77; B60J 10/7775; B60J 10/45; B60R 13/06
See application file for complete search history.

(56) References Cited

U.S. PATENT DOCUMENTS

| | | | |
|---|---|---|---|
| 4,047,751 A * | 9/1977 | Koike | B60J 10/248 296/146.9 |
| 6,854,786 B2 | 2/2005 | Berglund et al. | |
| 7,350,849 B2 | 4/2008 | Roush et al. | |
| 2001/0015035 A1 | 8/2001 | Nozaki | |
| 2002/0035806 A1 | 3/2002 | Yamashita et al. | |
| 2004/0025440 A1 | 2/2004 | Yanagita et al. | |
| 2012/0159860 A1* | 6/2012 | Matsuwaki | B60J 10/77 49/490.1 |
| 2014/0041302 A1* | 2/2014 | Heirtzler | B60J 10/046 49/31 |
| 2014/0075848 A1* | 3/2014 | Masumoto | B60J 10/046 49/495.1 |
| 2017/0001503 A1* | 1/2017 | Morioka | B60J 10/27 |
| 2017/0001504 A1* | 1/2017 | Takeda | B60J 10/27 |

* cited by examiner

*Primary Examiner* — Gregory Blankenship
(74) *Attorney, Agent, or Firm* — Quinn IP Law

(57) ABSTRACT

Disclosed are vehicle seal retainers, methods for making and methods for using vehicle seal retainers, and motor vehicles with pillar seal retainers. Disclosed, for example, is a seal retainer carrier for mounting a seal structure between the outer applique and body structure of a motor vehicle. The seal structure includes a flexible body with two seal lips. The outer applique has a tab and a flange. The seal retainer carrier includes a base attached to the vehicle's body structure. A first interface flange projects from the base and attaches to the outer applique's flange. A second interface flange projects from the base and includes a protruding rib attached to a second seal lip. This rib fits into a recessed groove of the seal structure such that the seal mounts between the outer applique and body structure with a hook of a first seal lip seated against the outer applique's tab.

20 Claims, 2 Drawing Sheets

PILLAR SEAL RETAINERS FOR MOTOR VEHICLE SEAL STRUCTURES

TECHNICAL FIELD

The present disclosure relates generally to seal structures for motor vehicles. More specifically, aspects of this disclosure relate to seal retainers for attaching window weatherstripping to motor vehicle body pillars, roof sections, or window frames.

BACKGROUND

Current production motor vehicles, such as the modern-day automobile, are originally equipped with compartment cover assemblies that are movably mounted to the vehicle body to provide access to the vehicle's various compartments. Driver-side and passenger-side vehicle doors, for example, can be opened and closed to allow user access for entering and exiting the passenger compartment. Most conventional vehicle doors include a retractable window that can be opened, for example, via a manual crank or a switchable electric motor to provide limited access to the passenger compartment. In contrast, the engine hood (or "bonnet" in some countries) extends over and covers the vehicle's engine compartment to prevent theft of or damage to the engine components. By comparison, a traditional trunk compartment is composed of a large storage bin that is covered by a trunk lid mounted underneath the passenger compartment's rear deck. Each compartment cover assembly fits within a complementary opening in the vehicle body, oftentimes hinged to a body-in-white frame section and secured closed by a separate latching mechanism.

Many of these openings contain abutting flange portions that are welded or press-formed together to join an exterior body panel with an interior panel or reinforcement substructure of the vehicle. These flanges are often exposed when the door assembly, hood or trunk lid is opened, and are therefore commonly covered by a seal structure (most commonly known as a "weatherstrip"), e.g., to prevent the unwanted ingress of rain, wind, dust, and other environmental conditions from the exterior of the vehicle. A secondary purpose of these seal structures is to improve aesthetic appearance, prevent unintentional evacuation of interior air (e.g., heating and air conditioning), and mitigate occupant perceptible exterior noise. For vehicle doors with a sashless window frame, an A-pillar/roof rail seal also functions to stabilize and reinforce the windowpane against vibrations and external loading generated during normal operation of the vehicle.

Many conventional pillar and roof-mounted weatherstrips are multi-part constructions composed of an extruded V-shaped seal body with an embedded reinforcing member, such as a metallic seal retainer clip, positioned on an inboard side of the seal body. A flexible sealing segment, which projects integrally from an outboard side of the body, includes opposing elastic sealing lips that jointly receive an exposed peripheral edge of the windowpane. In cooperation with an inboard retainer seal molded to the seal body, the retainer clip mounts the weatherstrip to an inner periphery of an A-pillar applique or other commensurate frame support structure. The A-pillar applique, in turn, is mounted to the A-pillar by a dedicated reinforcement bracket—the applique is adhered to a foam seal at a flanged outboard end of the bracket whereas the bracket itself is fastened at an opposing inboard end thereof to the A-pillar.

SUMMARY

Disclosed herein are vehicle seal retainers, methods for making and methods for using vehicle seal retainers, and motor vehicles with a vehicle body defining a body pillar with a weatherstrip mounted thereto by a pillar seal retainer. By way of example, and not limitation, a two-piece pillar seal retainer assembly is disclosed for mounting a weatherstrip seal structure to the A-pillar and A-pillar applique of a motor vehicle with a sashless door assembly. An injection molded A-pillar carrier (also referred to herein as "seal retainer carrier") is fabricated with a base that fastens directly to the A-pillar structure, e.g., via a series of screws and washers. Two interface flanges are integrally formed with and extend obliquely from the base, e.g., at an orthogonal or obtuse angle with respect to each other. The first interface flange attaches, e.g., via a series of snap-fasteners, to a lip projecting inwardly from the A-pillar outer applique. A second integrally formed interface flange is formed with one or more protruding ribs and/or one or more recessed channels for coupling to the seal structure.

To mount the weatherstrip seal structure to the vehicle, the A-pillar carrier is fastened along its base to the A-pillar structure. Prior to, contemporaneous with, or after mounting the A-pillar carrier, the A-pillar applique is fastened to the first interface flange of the carrier. The flexible seal body of the weatherstrip seal structure is then press-fit into a complementary cavity between the interconnected A-pillar applique and A-pillar carrier. The elastic nature of the seal structure allows the opposing seal lips to flex towards and then away from each other during and after insertion, respectively, such that retaining features on opposing lips of the V-shaped seal body (e.g., various protruding hooks and/or recessed grooves) mate with corresponding features of the A-pillar carrier and the A-pillar applique (e.g., ribs and/or channels).

Attendant benefits for at least some of the disclosed concepts include reducing the number of retainer parts and the number of steps required to securely mount the weatherstrip to the vehicle body. Fewer retainer parts, in turn, ameliorates design complexity of the seal retainer and lowers the overall mass of the system. Reducing design complexity and component count helps to realize reduced material costs, labor costs and manufacturing costs. Further, by removing the metallic seal retainer clip embedded in previous retainer designs, manufacturing processes are simplified by eliminating the process of riveting this section to the A-pillar during assembly. Correspondingly, the need for dedicated or specialized tools, such as a crimp-on-flange tool or a pneumatic rivet gun, is eliminated.

Aspects of the present disclosure are directed to seal retainer assemblies for mounting motor vehicle weather strips. Disclosed, for example, is a seal retainer carrier for mounting a seal structure to an outer applique and a body structure of a motor vehicle. The seal structure includes a flexible seal body with a pair of seal lips, namely a first seal lip with a hook and a second seal lip with a recessed groove. The outer applique has a tab and a flange that both protrude from an inner surface thereof. The seal retainer carrier includes a base that is configured to attach to the motor vehicle's body structure. First and second interface flanges are attached to and project from the base. The first interface flange is configured to attach to the flange of the outer applique. The second interface flange, in contrast, includes a protruding rib for attaching the seal retainer to the second seal lip. Specifically, the protruding rib of the second interface flange fits into the recessed groove of the seal structure's second lip such that the seal structure mounts between the outer applique and body structure with the hook of the first seal lip seated against the tab of the outer applique.

Other aspects of the present disclosure are directed to motor vehicles with multi-piece seal retainer assemblies for mounting weatherstips to frame sections of vehicle compartments. A "motor vehicle," as used herein, may include any relevant vehicle platform, such as passenger vehicles (internal combustion engine (ICE), hybrid, electric, fuel cell, etc.), commercial vehicles, industrial vehicles, buses, all-terrain vehicles (ATV), farm equipment, boats, airplanes, etc. In one example, a motor vehicle is disclosed that includes a vehicle body with a pillar structure adjacent a windowpane. An outer applique, which is disposed over the pillar structure, includes a lipped edge and an inner surface with an applique tab adjacent an applique flange. Both the applique flange and tab project in an inboard direction from the applique's inner surface. Underneath the outer applique is a seal structure composed of a flexible seal body with a pair of integrally formed seal lips. A pair of first hooks project from the first seal lip, and a groove is recessed into the second seal lip. The first and second seal lips jointly receive a peripheral edge of the windowpane.

The foregoing motor vehicle also includes a single-piece seal retainer carrier that is interposed between the pillar structure and the outer applique. The seal retainer carrier includes a base that is integrally formed with first and second interface flanges. The base mounts directly to the pillar structure of the vehicle body, e.g., via a series of fasteners. The first interface flange projects at a first oblique angle from the base and mounts directly to the outer applique's flange, e.g., via a series of fasteners, to define a cavity between the carrier and outer applique. The second interface flange projects at a second oblique angle from the base and includes a protruding rib. The seal structure is press-fit into the cavity between the seal retainer carrier and outer applique. In so doing, one of the first hooks of the first seal lip is secured between the applique tab and applique flange, another of the first hooks is secured between the applique tab and lipped edge, and the protruding rib of the seal retainer carrier is seated inside the recessed groove of the second seal lip.

According to other aspects of the present disclosure, methods of making and methods of using vehicle seal retainers are presented. For instance, a method is disclosed for constructing a seal retainer carrier for mounting a seal structure to an outer applique and a body structure of a motor vehicle. The method includes: forming a base that attaches to the body structure of the motor vehicle; attaching a first interface flange to the base such that the first interface flange projects outboard from the base, the first interface flange being formed to attach to a flange of the outer applique; and attaching a second interface flange to the base such that the second flange projects outboard from the base, the second interface flange including a protruding rib formed to attach to a seal lip of the seal structure. The protruding rib of the second interface flange is designed to fit into a recessed groove of the seal structure such that the seal structure mounts between the outer applique and the body structure with a hook of a seal lip seated against a tab of the outer applique.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
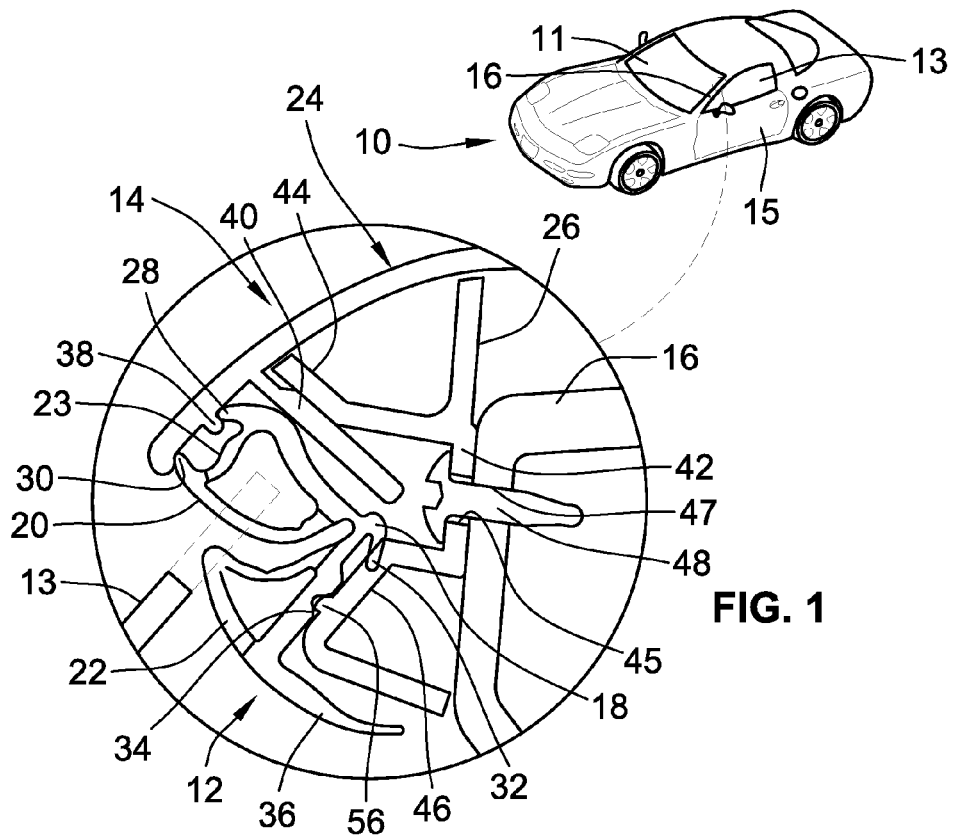
FIG. 1 is an elevated perspective-view illustration of a representative motor vehicle with an inset cross-sectional view of a weatherstrip seal structure and seal retainer in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, designated generally at 10, with a weatherstrip seal structure 12 and a seal retainer assembly 14. Mounted at a medial portion of the automobile 10, e.g., bordering a driver-side windowpane 13 aft of a front windshield 11, the seal structure 12 is attached via the seal retainer assembly 14 to an A-pillar 16 adjacent a sashless door assembly 15. The illustrated automobile 10—also referred to herein as "motor vehicle" or "vehicle" for short—is merely an exemplary application with which the novel aspects of this disclosure can be practiced. In the same vein, the implementation of the present concepts into an A-pillar seal configuration for a sashless door assembly should also be appreciated as an exemplary application of the novel concepts disclosed herein. As such, it will be understood that the aspects and features of the present disclosure can be integrated into other vehicle seal configurations and utilized for any logically relevant type of motor vehicle. Lastly, the drawings presented herein, are not necessarily to scale and are provided purely for instructional purposes. Thus, the specific and relative dimensions shown in the drawings are not to be construed as limiting.

Seal structure 12 of FIG. 1 is generally intended to provide a fluid seal between an upper peripheral edge of the door assembly's 15 windowpane 13 and an inner periphery of the vehicle body's A-pillar 16. For at least some embodiments, the seal structure 12 can also function to stabilize and reinforce the windowpane 13 against vibrations and loading generated during operation of the vehicle 10. A weatherstrip seal structure 12 of this type can be formed as a single-piece unitary structure, for example, extruded or die molded from natural or synthetic rubber, such as ethylene-propylene-diene (EPDM) rubber or other elastic copolymer. In the illustrated example, the seal structure 12 if fabricated as an elongated flexible seal body 18 with first and second hollow seal lips 20 and 22, respectively. This flexible seal body 18, including the integral seal lips 20, 22, can extend approximately the entire length of the A-pillar 16 and, optionally, the adjacent section of roof rail. When the sashless door assembly 15 is closed and the windowpane 13 is raised, the opposing seal lips 20, 22 are juxtaposed to jointly receive a peripheral edge of the windowpane 13, as seen in FIGS. 1 and 2.

Figure 2:
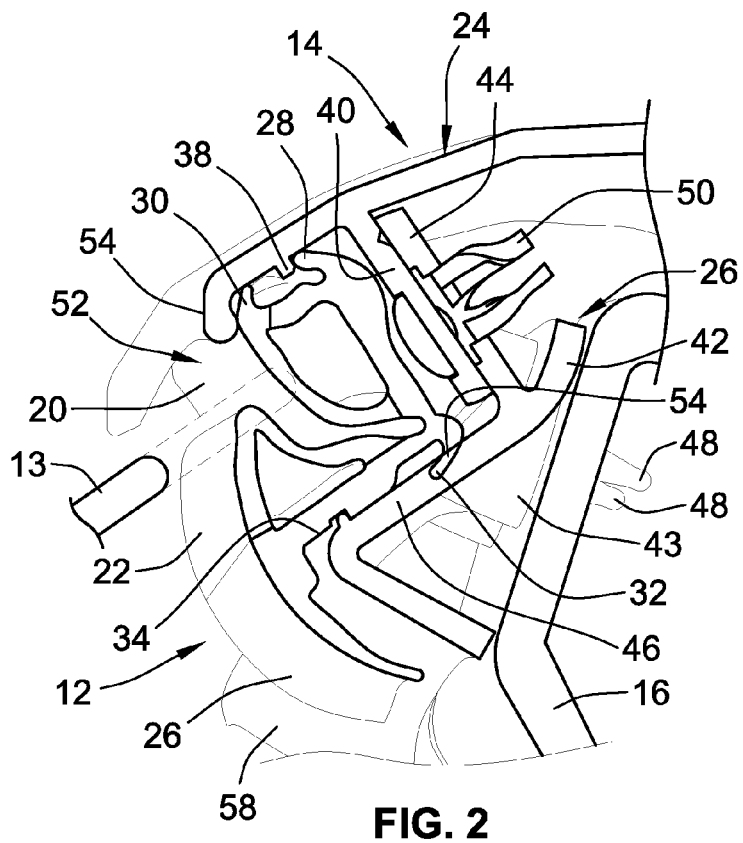
FIG. 2 is sectional perspective-view illustration of the representative weatherstrip seal structure and seal retainer of FIG. 1.

With continuing reference to FIGS. 1 and 2, the weatherstrip seal 12 is formed with structural features for operatively connecting to the two members of the seal retainer assembly 14, namely an outer applique 24 and a seal retainer carrier 26. By way of non-limiting example, a pair of (first) hooks 28 and 30 projects from an outboard edge of the first seal lip 20 to mechanically couple the seal structure 12 to the outer applique 24, as will be described in further detail below. In the illustrated example, the curved ends of the hooks 28, 30 face each other to define a pocket 23 therebetween. A (second) hook 32 projects from an inboard edge of the second seal lip 22, e.g., where the first and second seal lips 20, 22 intersect. Recessed into the second seal lip 22 is an elongated groove 34, which is spaced outboard from the hook 32. The hook 28 and groove 30 of the second seal lip 22 function to mechanically couple the seal structure 12 to the seal retainer carrier 26, as will be described in further detail below. A leg 36 projects from an outboard edge of the second seal lip 22, e.g., opposite that of the second hook 32, to partially conceal the seal retainer carrier 26. It should be appreciated that the seal structure 12 can take on any of an assortment of sizes, orientations, and geometries within the scope of this disclosure.

An A-pillar outer applique (also known in the art as "pillar cover" or "pillar trim") is provided as a decorative member to visually conceal the outer surface of the A-pillar structure and/or to create a weatherproofing shield to protect the vehicle body's pillar structure. The outer applique 24 in FIG. 1, for instance, is depicted extending over and covering the A-pillar 16 (also referred to herein as "pillar structure") as well as portions of the seal structure 12 and seal retainer carrier 26. Formed from cast metal, injection molded polymer or other suitable material, the outer applique 24 can be an elongated member that, like the seal structure 12, extends approximately the entire length of the A-pillar 16. To mechanically couple the outer applique 24 to the seal structure 12 and seal retainer carrier 26, an applique tab 38 and an applique flange 40 both project inboard from an inner surface of the outer applique 24. The applique tab 38 is spaced from and oriented generally parallel with the applique flange 40. Like the seal structure 12, the outer applique 24 can take on alternative shapes and sizes from that which are shown in the drawings.

Figure 3:
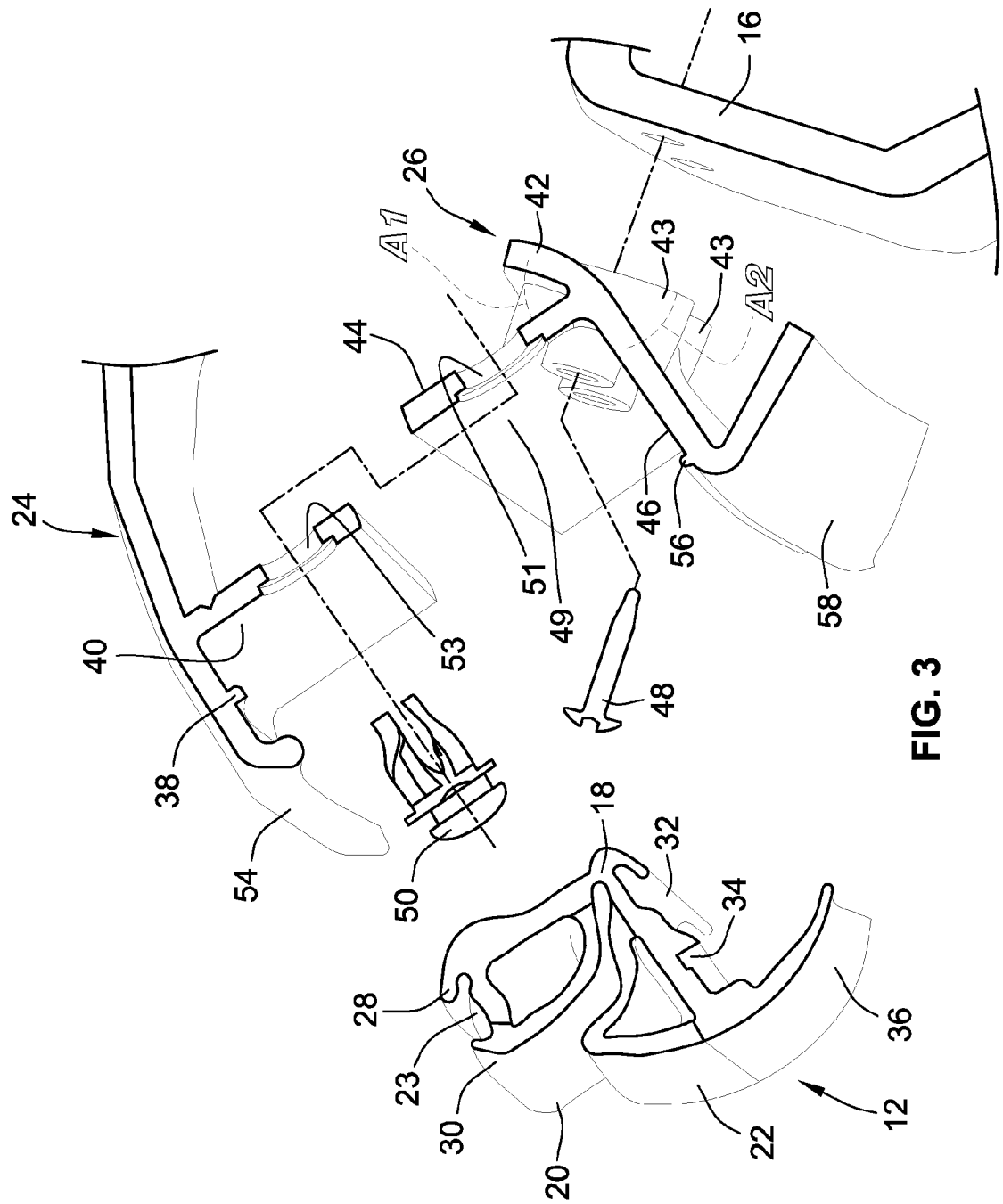
FIG. 3 is an exploded sectional perspective-view illustration of the weatherstrip seal structure and seal retainer of FIG. 1.

Interposed between the pillar structure 16 and outer applique 24 is a seal retainer carrier 26 for mounting the seal structure 12 and outer applique 24 to the pillar structure 16. In accordance with the illustrated example, the seal retainer carrier 26 is an injection molded, single-piece component with an elongated and rigid carrier base 42 that is integrally formed with first and second interface flanges 44 and 46, respectively. The first interface flange 44 is shown in FIG. 3 projecting at a first oblique angle A1 (e.g., about 50-55 degrees) from the carrier base 42, while the second interface flange 46 is shown in FIG. 3 projecting at a second oblique angle A2 from the carrier base 42 (e.g., about 30-35 degrees). With this configuration, the first interface flange 44 is generally orthogonal to or slightly obtuse with respect to the second interface flange 46. Elongated base 42, including the interface flanges 44, 46, can extend continuously along the entire length of the A-pillar 16 and, optionally, some or all of the adjacent section of roof rail. In so doing, the base 42 has a length that is approximately equal to or greater than a length of the pillar structure 16, e.g., such that the interface flanges 44, 46 extend continuously or substantially continuously along the length of the pillar 16. Alternative carrier configurations are envisioned that take on different shapes, sizes and/or materials from that described above depending, for example, on the intended application of the disclosed concepts.

As seen in FIGS. 1 and 2, the seal retainer carrier 26 is mounted directly to the pillar structure 16 of the motor vehicle 10. Carrier base 42, for example, includes a series of cylindrical base landings 43 that each abuts and lays flush against the body structure 16. Each base landing 43 includes a fastener hole 45 (FIG. 1) that receives therethrough a respective bolt 48. Once fed through the base landing 43, the bolt 48 threadably mates with a complementary slot 47 in the pillar structure 16. In this regard, the seal retainer carrier 26 is also mounted directly to the outer applique 24 and the seal structure 12. First interface flange 44, for example, includes a flange landing surface 49 that abuts and lays flush against the applique flange 40. The flange landing surface 49 includes a fastener hole 51 (FIG. 3) for receiving therethrough a snap fastener 50. This snap fastener 50 is fed through a complementary slot 53 in the applique flange 40 and into the flange landing surface 49 to thereby attach the seal retainer carrier 26 to the outer applique 24. Other embodiments may use other means for mechanically or adhesively attaching together the seal retainer carrier 26, outer applique 24 and pillar structure 16.

Attaching the first interface flange 44 to the applique flange 40 defines a cavity 52 between the seal retainer carrier 26 and the outer applique 24. The flexible seal body 18 of the weatherstrip seal structure 12 is then press-fit into the complementary cavity 52 between the interconnected applique 24 and carrier 26. As indicated above, the elastic nature of the seal structure 12 allows the opposing seal lips 20, 22 to flex towards each other during insertion and then flex away from each other after properly seating within the cavity 52. During the insertion process, the inner most (first) hook 28 of the first seal lip 20 is secured between the applique tab 38 and applique flange 40, while the outer most (first) hook 30 of the first seal lip 20 is secured between the applique tab 38 and lipped edge 54 of the outer applique 24. A rib 56 protruding from the second interface flange 46 is seated inside the recessed groove 34 of the second seal lip 22. Concomitantly, the (second) hook 32 of the second seal lip 22 is compressed against interface flange 46 or, alternatively, seats within a channel or against a tab (neither shown) of the second interface flange 46 of seal retainer carrier 26. With this press-fit engagement, the seal structure 12 is mechanically coupled to the outer applique 24, the seal retainer carrier 26 and, thus, the pillar structure 16. Projecting from an outboard edge of the second interface flange 46 is an optional leg 58 that is configured to abut the body structure 16 and thereby prevent rotation of the seal retainer carrier 26 during the foregoing assembly process.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A seal retainer carrier for mounting a seal structure to an outer applique and a body structure of a motor vehicle, the seal structure including a flexible seal body with a first seal lip having a hook and a second seal lip having a recessed groove, the outer applique having a tab and a flange protruding from an inner surface thereof, the seal retainer carrier comprising:
    a base configured to attach to the body structure of the motor vehicle;
    a first interface flange attached to and projecting from the base, the first interface flange being configured to attach to the flange of the outer applique; and
    a second interface flange attached to and projecting from the base, the second interface flange including a protruding rib configured to attach to the second seal lip,
    wherein the protruding rib of the second interface flange fits into the recessed groove of the seal structure such that the seal structure mounts between the outer applique and the body structure with the hook of the first seal lip seated against the tab of the outer applique.

2. The seal retainer carrier of claim 1, wherein the base, the first interface flange and the second interface flange are integrally formed as a single-piece unitary structure.

3. The seal retainer carrier of claim 1, wherein the first and second interface flanges project at respective first and second oblique angles from the base.

4. The seal retainer carrier of claim 1, wherein the first interface flange is generally orthogonal with respect to the second interface flange.

5. The seal retainer carrier of claim 1, wherein the second interface flange is configured to sealingly press against a second hook projecting from the second seal lip of the seal structure.

6. The seal retainer carrier of claim 1, wherein the second interface flange further includes a leg projecting therefrom and configured to abut the body structure and thereby prevent rotation of the seal retainer carrier.

7. The seal retainer carrier of claim 1, wherein the body structure of the motor vehicle is an elongated pillar structure adjacent a windowpane, and wherein the base of the seal retainer carrier is an elongated structure with a length approximately equal to a length of the pillar structure.

8. The seal retainer carrier of claim 7, wherein the first and second interface flanges extend continuously along the length of the base.

9. The seal retainer carrier of claim 1, wherein the base includes a base landing configured to abut the body structure, the base landing including a fastener hole configured to receive therethrough a fastener and thereby attach the seal retainer to the body structure.

10. The seal retainer carrier of claim 1, wherein the first interface flange includes a flange landing surface configured to abut the applique flange, the flange landing surface including a fastener hole configured to receive therethrough a fastener and thereby attach the seal retainer to the outer applique.

11. The seal retainer carrier of claim 1, wherein attaching the first interface flange to the applique flange defines a cavity between the seal retainer carrier and the outer applique, the seal structure being press-fit into the cavity between the seal retainer carrier and the outer applique.

12. A motor vehicle, comprising:
    a vehicle body with a pillar structure adjacent a windowpane;
    an outer applique disposed over the pillar structure, the outer applique including a lipped edge and an inner surface with an applique tab adjacent an applique flange, both the applique tab and applique flange projecting inboard from the inner surface;
    a seal structure including a flexible seal body integrally formed with first and second seal lips, a pair of first hooks projecting from the first seal lip, and a groove recessed into the second seal lip, the first and second seal lips jointly receiving a peripheral edge of the windowpane; and
    a single-piece seal retainer carrier disposed between the pillar structure and the outer applique, the seal retainer carrier including a base integrally formed with first and second interface flanges, the base being attached to the pillar structure of the vehicle body, the first interface flange projecting at a first oblique angle from the base and attaching to the applique flange of the outer applique to define a cavity, and the second interface flange projecting at a second oblique angle from the base and including a protruding rib,
    wherein the seal structure is press-fit into the cavity between the seal retainer carrier and the outer applique with the one of the first hooks of the first seal lip secured between the applique tab and applique flange, another of the first hooks of the first seal lip secured between the applique tab and the lipped edge, and the protruding rib of the seal retainer carrier seated inside the recessed groove of the second seal lip.

13. A method of constructing a seal retainer carrier for mounting a seal structure to an outer applique and a body structure of a motor vehicle, the seal structure including a flexible seal body with a first seal lip having a hook and a second seal lip having a recessed groove, the outer applique having a tab and a flange protruding from an inner surface thereof, the method comprising:
    forming a base configured to attach to the body structure of the motor vehicle;

attaching a first interface flange to the base to project outboard from the base, the first interface flange being configured to attach to the flange of the outer applique; and attaching a second interface flange to the base to project outboard from the base, the second interface flange including a protruding rib configured to attach to the second seal lip, wherein the protruding rib of the second interface flange fits into the recessed groove of the seal structure such that the seal structure mounts between the outer applique and the body structure with the hook of the first seal lip seated against the tab of the outer applique.

14. The method of claim 13, wherein the forming and attaching steps include integrally forming the base, the first interface flange, and the second interface flange as a single-piece unitary structure.

15. The method of claim 13, wherein the first and second interface flanges project at respective first and second oblique angles from the base.

16. The method of claim 13, wherein the first interface flange is generally orthogonal with respect to the second interface flange.

17. The method of claim 13, wherein the second interface flange is configured to sealingly press against a second hook projecting from the second seal lip of the seal structure.

18. The method of claim 13, wherein the second interface flange further includes a leg projecting therefrom and configured to abut the body structure and thereby prevent rotation of the seal retainer.

19. The method of claim 13, wherein the body structure of the motor vehicle is an elongated pillar structure, and wherein the base of the seal retainer carrier is formed as an elongated structure with a length approximately equal to a length of the pillar structure.

20. The method of claim 19, wherein the first and second interface flanges extend continuously along the length of the base.

* * * * *